United States Patent [19]

Powell

[11] Patent Number: 5,291,397

[45] Date of Patent: Mar. 1, 1994

[54] METHOD FOR RESOURCE ALLOCATION AND PROJECT CONTROL FOR THE PRODUCTION OF A PRODUCT

[76] Inventor: Roger A. Powell, 1740 Hollins Rd., Bensalem, Pa. 19020

[21] Appl. No.: 811,535

[22] Filed: Dec. 20, 1991

[51] Int. Cl.$^5$ .................... G06F 15/20; G06F 7/48
[52] U.S. Cl. ......................... 364/402; 364/148
[58] Field of Search ............ 364/401, 148, 153, 154, 364/402; 395/925

[56] References Cited

U.S. PATENT DOCUMENTS

| | | | |
|---|---|---|---|
| 3,703,725 | 4/1972 | Gomersall et al. | 444/1 |
| 3,845,286 | 10/1974 | Aronstein et al. | 444/1 |
| 4,027,246 | 5/1977 | Caccoma et al. | 235/151.1 |
| 4,089,056 | 5/1978 | Barna et al. | 364/551 |
| 4,208,712 | 6/1980 | Deutsch et al. | 364/105 |
| 4,648,023 | 3/1987 | Powell | 364/156 |
| 4,827,423 | 5/1989 | Beasley et al. | 364/468 |
| 5,128,860 | 7/1992 | Chapman | 364/401 |

*Primary Examiner*—Donald E. McElheny, Jr.
*Assistant Examiner*—Laura Brutman

[57] ABSTRACT

A control system for the manufacture of a product is disclosed. A network of events and activities and a baseline schedule is constructed. Actual and predicted deviations to the baseline schedule, which are called slack variables, are used to predict the actual final completion date, using parallel processing. These slack variables are also used to selectively allocate resources to elements of the manufacturing process. Critical elements and critical dates are readily determined. The incremental cost of incremental schedule improvement can be readily determined. The current status of a project can be described in a single variable.

6 Claims, 2 Drawing Sheets

METHOD FOR RESOURCE ALLOCATION AND PROJECT CONTROL FOR THE PRODUCTION OF A PRODUCT

BACKGROUND OF THE INVENTION

This invention is directed to a control system for the production of a product. The control system of this invention has the capability of rapid information processing and display, minimizing production cycle time, efficiently allocating resources, and minimizing excess costs.

In the production of products, the work effort is a sequence of operations. The proper control of these operations is as important to the efficient transformation of the product from its initial state into its finished state as the individual operations themselves. Just as an improvement in each operation can improve the production rate, an improvement in the control of the production process can produce a similar reduction in total cost and the elapsed time of production.

For example, in U.S. Pat. No. 3,703,725, the method of control uses a computer to balance work flows in a manufacturing process. In U.S. Pat. No. 3,845,286, a control system sequences semiconductor wafers through a number of workstations. In U.S. Pat. No. 4,027,246, a central computer controls the transfer and processing of semiconductor wafers. Although these inventions teach methods for manufacturing control, and an improvement in efficiency, they do not teach a method for maximizing manufacturing efficiency and thereby minimize manufacturing time and cost. In the production of any product, the costs of idle waiting time, penalties due to late delivery, unjustified expediting costs, and the costs of excess inventories must be minimized.

One system that has addressed this problem is the Critical Path Method (CPM), in which a network of activities is created that represents the sequence of operations and the interdependencies of the operations in the particular production process. A variation on this basic method is Project Evaluation and Review Technique (PERT) which uses multiple estimates of time durations to provide a probabilistic output. These systems are available as computer software. To use these systems, the networks are analyzed to fine the critical path; i.e., the path that is, in effect the longest duration, and which determines the final completion date.

A major problem of these systems is that critical items that lie on the critical path must be searched serially; each requiring a computer run, at a considerable expense in time and money on large projects. Also, potentially critical items are not identified. Further, for every change in the availability date of any item, the impact on the final completion date can only be assessed by another computer run. Although valuable, these systems do not provide an easy and timely visability into the critical items and their degree of impact. Also, these systems do not offer a means to balance resources in order to minimize the time and cost of a project.

OBJECTS OF THE INVENTION

One object of this invention is to provide a control system for producing a product that provides a means for searching the production process in parallel for critical items and to place those items in order by their degree of criticallity. Another object is to provide information for real time responses to inquires about the impact of changes in the availability of an item. Another object is to provide a production control system that establishes a method of allocating resources to provide the optimal distribution of those resources. Another object is to provide a means to monitior the progress of a production sequence of operations. Another object is provide current actual cost and projected cost information. Another object is to identify conflicts in resource usage. Further objects and advantages will be apparent upon reading the following description in conjunction with the drawings.

SUMMARY OF THE INVENTION

This production control system establishes a network of production activities, assigns time duration estimates to each activity, and establishes baseline schedule dates for the beginning and completion of each activity. This baseline schedule date data set is used as a constant reference against which all supporting external component availabilities and actual internal progress is measured. The principal control variable is a measure of the projected or actual deviation from the baseline schedule date data set and is called slack. This slack variable is used to determine the projected final completion date, allocate resources, and order jobs in queue.

DETAILED DESCRIPTION OF THE PREFERRED EMBODIMENT

To facilitate the description of the invention, it is worthwhile to define some conventions solely for this purpose. These conventions are somewhat arbitrary and should not be construed as limiting to the generality of the invention. For the purpose of this description:

A. Time is measured in working days.

B. Each working day is assigned a sequential number called the "date" representing the calendar date or point in time; the number increases with later calendar dates.

C. Slack is the amount of time that a component or a path in the network must wait idly for another component to be available or another event to occur during a project. Slack is equal to the requirement date (from the baseline schedule) minus the availability date. Therefore, if the requirement date is later in time (a higher number) than the availability date (a lower number), the slack is positive and idle waiting time will occur. If the availability date is later than the requirement date, the slack is negative; which indicates a real or potential constraint on the schedule and the final completion date.

D. Least slack is defined in the algebraic sense, meaning the most negative amount; e.g. negative 6 ($-6$) is less than positive 4 ($+4$).

Figure 1:
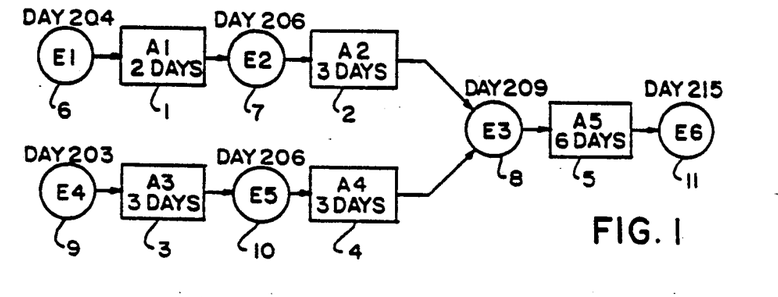
FIG. 1 shows a typical network of events and activities that describes the sequence of steps and interdependencies in the production of a product.

In FIG. 1, in the production process of a product, the time-consuming product transformation operations may be defined as activities, 1, 2, 3, 4, 5, and each one is identified by the letter "A" and a numerical suffix; e.g., "A1", "A2", etc. At the beginning and the end of each activity, 1, 2, 3, 4, 5, there exists a condition or state that occurs at a moment in time and which is defined as an event, 6, 7, 8, 9, 10, 11; for example, "Activity A1 completed, Activity A2 ready to begin". Events 6, 7, 8, 9, 10, 11, are identified by the letter "E" and a numeric suffix; for example, "E1", "E2", etc.

FIG. 1 shows a network of activities 1, 2, 3, 4, 5, and events 6, 7, 8, 9, 10, 11, flowing from left to right. The interconnecting arrows show the direction of time and material flow, also flowing from left to right, and the interdependencies between the activities, 1, 2, 3, 4, 5, and the events, 6, 7, 8, 9, 10, 11. For example, activity A5, 5, cannot begin until event E3, 8, has occured, which is: "Activity A2 complete, Activity A4 complete, Activity A5 ready to begin". Within each activity block 1, 2, 3, 4, 5, is shown the estimated time duration of the activity. This estimate includes waiting in queue, machine time, and time to transport to the next workstation. The foregoing parallels the Critical Path Method (CPM) of network analysis except that CPM requires that the beginning events in each path be interconnected to each other at a single first node. A network such as that in FIG. 1 is generated to include all the production steps (such as engineering, purchasing, fabrication, and assembly) for all the components required in the complete product. The production control staff will identify the material, tools, and resources required at each event, 6, 7, 8, 9, 10, 11, to support the next activity, 1, 2, 3, 4, 5. This identification task is the same as that normally performed by the production control personnel in many existing systems of control.

The next step is the assignment of dates to each event. The desired final completion date is assigned to the final completion event, E6, 11 in FIG. 1. In this example, "day 215" is used. The prior events are assigned their dates by moving from right to left (backward with respect to time) and subtracting the time duration estimate of the intervening activity from the date of the event that follows that activity. For example, the date for E3, 8, equals the date for E6, 11, minus the duration of A5, 5; i.e., day 209 equals day 215 minus 6 days. The result shown in FIG. 1 is the baseline schedule. This step may be performed automatically by a digital computer based on the foregoing input data.

The network shown in FIG. 1 has no slack (or waiting time) within the flow. This is by design and is a major difference with the Critical Path Method (CPM). Any event that occurs later than its baseline schedule date will cause the final completion date to be equally late unless corrective action is taken. Similiarly, any forcast of an event being late is also a direct forecast of the lateness of the final completion date.

Figure 2:
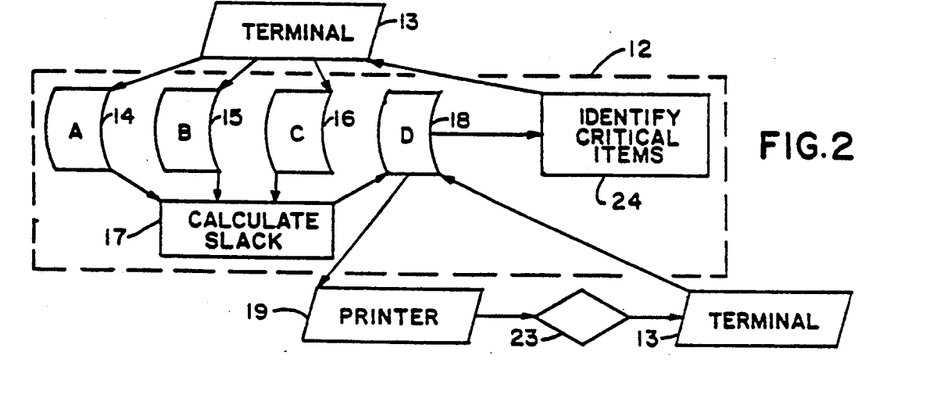
FIG. 2 shows a schematic drawing of the portion of control system for monitoring and controlling external components.

The information from the baseline schedule in the form of each event and its associated baseline schedule date can be loaded via a terminal, 13, into memory field A, 14 in the control computer, 12, as shown in FIG. 2.

At this point it is beneficial to describe the control system in two parts: the first part being the control of external components and the second part being the control of internal operations, which will be described later. An external component is defined as a required item that has not yet entered the network is not being tracked internally as part of the network flow.

As shown in FIG. 2, the information prepared by the production control personnel linking each required external component with the event that requires the component is loaded via a terminal 13 into memory field B, 15, in the control computer, 12. Each external component is assigned a unique number for identification purposes. The availability date for each external component is estimated internally or by the component's vendor and loaded via a terminal, 13, into memory field C, 16, in the control computer, 12. Using pre-programmed instructions, the external slack calculator, 17, in the control computer, 12, serially retrieves each external component and its associated event from memory field B, 15, retrieves the baseline schedule date associated with that event from memory field A, 14, and retrieves the external component's availability date from memory field C, 16. For each external component, the external slack calculator, 17, subtracts the component's availability date from the component's baseline schedule date and defines the result as the "external slack variable" for that external component. The external slack variable associated with each external component, its event, baseline schedule date, and availability date are transmitted and stored in memory field D, 18, in the control computer, 12.

When the external slack variable for each of the components has been calculated and stored, the control computer, 12, prints out the collected and calculated data from memory field D, 18, on printer, 19. An example printout is simulated in Table 1. Column 1 is the identification number of each external component. Column 2 is the first event at which the external component is required. At all subsequent events, the component will be an internal item and controlled by a method that will be explained later. Column 3 is the baseline schedule date associated with the event in Column 2; this is the date when the external component is required. Column 4 is the estimated availability date of the external component which have been estimated by the providers of the component. Column 5 is the external slack variable which is equal to the date in Column 3 (baseline schedule date) minus the date in Column 4 (availability date). The last columns are a graphical representation of the slack variable in Column 5.

Within this set of external components, the final completion date will be determined by the external component that has the least slack value and the final completion date will be late or early by an amount equal to that component's slack value. In the Table 1 example, external component 91005 will pace the final completion date since it has the least slack value of $-2$. In other words, external component 91005 has the most late availability with respect to its baseline schedule date (or requirement date). The final completion date will be two days late ($-2$ days of slack) due to this component. Using this control system, the critical component and the component's impact on the final completion date are immediately determined. In order to improve the final completion date, only resources concentrated on the critical component (91005) will have an impact on the final completion date. The rest of the components will not have any effect on the final completion data as long as their slack values are not the least. Therefore, the slack values of the non-critical components can decrease within this limitation of the critical component without producing any schedule impact. When management personnel review the information shown in Table 1, they can readily determine the impact of each external component upon the final completion data and they can predict the final completion date based on the component with the least slack. If this slack is negative, the final data will be late by an amount equal to the numerical value of that slack. Management personnel must determine if the lateness and the degree of lateness are acceptable, and if not, what degree of lateness is acceptable. For example, management may accept a lateness of one day. This is translated into a slack value of negative one (−1), and is called the "Project External Slack Goal". This management decision process, 23, is shown in FIG. 2. This information is transmitted via terminal, 13, to memory field D, 18, in the control computer, 12.

The "Project External Slack Goal" is the value that all external component slack variables will be measured against. Any external component with a slack variable less than the project external slack goal must have its slack increased to be at least equal to the project external slack goal. This is typically done by improving the component's availability data by expending additional resources. Then a subroutine, 24, in the control computer, 12, searches memory field D, 18, and identifies the external components with slack variables less than the the project external slack goal. These components are critical and their availability dates must be improved by the allocation of additional resources so that their new slack variables are equal to the project external slack goal. The subroutine, 24 can also be programmed to list near-critical components so that they may be kept under close scrutiny.

The project external slack goal and the critical components listing are transmitted to production control personnel via a terminal, 13, with the instruction to concentrate on improving the availability dates on the listed critical components in order to satisfy the project external slack goal. The availability dates of the critical components may be improved by shifting common or interchangable resources from less critical components (those having higher slack variables) to the critical components. This will improve the availability dates of the critical components (thereby increasing their slack values) while making the availability dates of the less critical components later (thereby decreasing their slack values). This redistribution of resources and slack causes the external slack values to gravitate toward a central value. If resources are perfectly interchangable and optimally allocated, all components would evolve to a single external slack value and all components would arrive Just-In-Time (J-I-T).

As the availability dates are revised, reflecting the expenditure of additional resources, they are transmitted via terminal, 13, by production control personnel to memory field C, 16, in the control computer, 12. The external slack calculator, 17, will calculate the new slack variable and update memory field D, 18, and periodically present the results to management personnel via a printer, 19, for reconsideration of the project external slack goal decision, 23.

Since these functions are so simple and straightforward, the control computer, 12, can quickly determine the new external slack variable for each component based on its availability date estimate, compare it to the project external slack goal, determine its criticallity and respond to the production control personnel via the terminal, 13, in a few seconds. This allows the production control personnel to take immediate action if the subject component is reported to be critical.

Similarly, the control computer, 12, can calculate a critical date for each component which is equal to the baseline schedule date for each component minus the project external slack goal. For the components in the example in Table 1 and a project external slack goal equal to −1, the critical dates are shown in Table 2. Each component must arrive no later than its critical date if the management determined project external slack goal is to be satisfied. If the project external slack goal is changed by management, the listing can be easily updated. Any user of the list needs only to compare a revised availability date with that component's listed critical date to determine the impact of the revision. If the revised availability date is earlier than the critical date, the project external slack goal will not be violated and no remedial action is required. Therefore, the individual does not need access to a computer terminal to make this assessment. This process can be automated on the control computer, 12.

Figure 3:
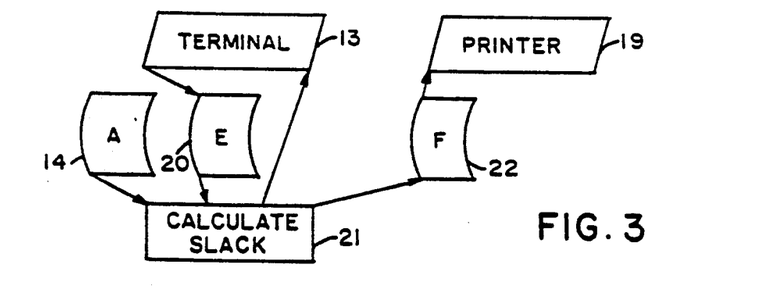
FIG. 3 shows a schematic drawing of the portion of the control system for monitoring and controlling internal operations.

The second portion of the control system monitors the internal operations. After an external component enters the network, its progress is monitiored as part of the flow of material through each activity in the remainder of the network. When an activity is complete, the internal component is sent to the appropriate workstation for its next activity. One workstation may support several different activities during the project. When the internal component arrives at the next activity workstation, it is checked against the list of components (internal and external) required for the next activity. When all of the necessary components have arrived at the activity workstation, the event proceeding that activity is considered to have occurred. As shown in FIG. 3, at least once per day, all events that have occurred in the queue for each workstation are identified and transmitted via terminal, 13, to memory field E, 20, in the control computer, 12, along with the present date. For each event, the event slack calculator, 21, in the control computer, 12, retrieves the baseline schedule date for each event from memory field A, 14, (previously loaded for external components), and calculates each event's internal slack variable, which is equal to the event's baseline schedule data minus the present data. The internal slack calculator then arranges the events for each workstation in the order of increasing slack and transmits this listing to the terminal, 13, for the subject workstation. The workstation personnel can now put the events and their following activities in order in the queue with respect to increasing slack from the listing. Therefore, the events with the least slack (and therefore the most critical) are placed at the head of the queue to be processed first. In essence, some of the excess slack from activities at the rear of the queue (less critical) is lost to gain more slack at the front of the queue (more critical). This results in the event slack variables gravitating toward a central value and approaching an optimal allocation of resources. The event calculator also directs the event internal slack variables to memory field F, 22, where they are accumulated and printed on the printer, 19, for review by management personnel. As management personnel reviews this information, the network paths with the least slack (most critical) become obvious. Management personnel can redirect common or interchangable resources from events with more slack (less critical) to these more critical events.

Management personnel have received the external slack and internal slack information from the control computer, 12, as previously described. The final completion date will be determined by the external components or the internal events with the least slack. Management personnel may allocate additional resources to improve the slack of the critical and near critical external components and/or internal events (expediting activities to minimize their durations). The cost of these additional resources can be justified by the avoidance of penalty costs for late completion or earning bonuses for early completion. To aid management personnel in this process, the cost of availability date improvement can be calculated. For each of the most critical external components and internal events, the cost for improved availability per day are estimated. These costs are shown graphically in Table 3 for external components. The costs for internal events would be shown in a similiar manner.

In Table 3, column 1 identifies the external component by number. Since it is only necessary to concentrate on the components with the least slack, the components from Table 1 with slack of +2 or greater are not shown. Column 2 shows the event that the external component is required to support. Column 3 shows the present slack value. The next 5 columns show the cost to improve each components availability for each incremental day shown at the top of each column. For example, component 91001 requires $200 for each day of improvement in its availability. It now has a slack of −1. To improve its availabilty three days to a slack value of +2, will cost three times $200 or $600.

On the bottom row of the table is accumulated the network cost of schedule improvement (increased slack) for the improved slack value shown at the top of each column. The accumulation is computed by starting at the right-most column, and moving to the left, summing the entries in each column with the entries from all columns to the right, and entering the accumulated total under the subject column. In this example, the cost to improve the final completion date by 1, 2, 3, and 4 days (change the slack to −1, 0, +1, and +2, respectively) is $200, $600, $5000, and $9600, respectively. These incremental additional costs can be compared to the penalty costs or bonuses related to the final completion date, and a determination can be made if and at what level additional costs can be justified. Management personnel can then adjust the project external slack goal accordingly and the previously described system will transmit the information to make the adjustment accordingly. The control of internal events can also utilize a project event slack goal that would be determined by management personnel and operate in a manner similar to the project external slack goal.

The structure of the computerization may be changed to use a number of small personal computers, each used by an individual responsible for the control of several events, since this system is readily modularized. A minimum of communication is required between the personal computers and management personnel; the external components and events with the least slack and their associated availability improvement costs must be transmitted to management personnel on an internal communication loop, and after aggregating the data from all the personal computers and reviewing it (such as constructing a Table 3 type matrix), management personnel would respond with the project external slack goal and the project event slack goal. Typically, these values would be the same, but the project management could bias them if desired.

In similar manner, a very large project extending over many companies, can use this control system with a minimum of communication. Each company would be analogous to the individual with the personal computer, transmitting critical component slack information to a central management and receiving project slack goal information from the central management. Timing compatability at the transfer points of hardware between companies only requires that the project slack goal value is the same for all companies and their baseline schedule dates are compatable (no imbedded slack).

Figure 4:
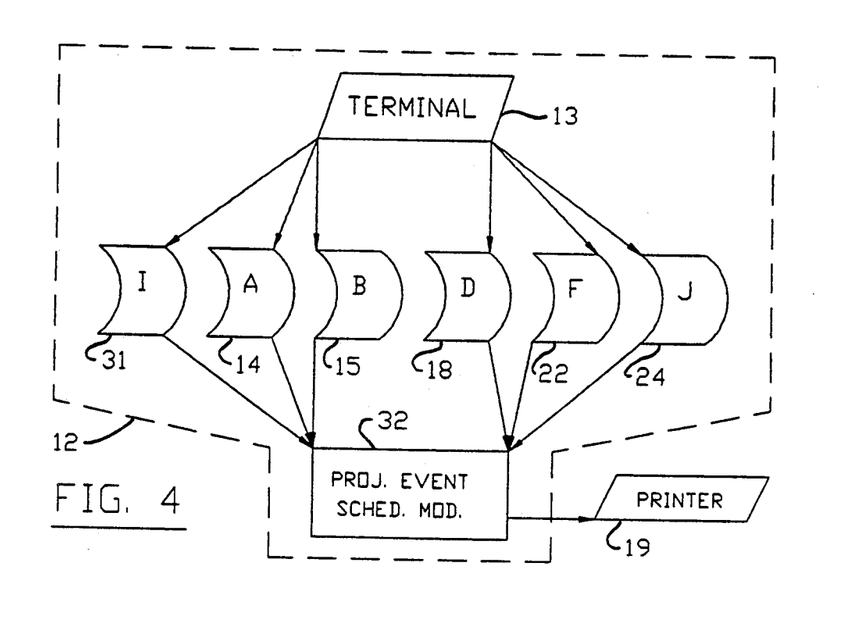
FIG. 4 shows a schematic drawing of the portion of the control system for calculating a projected project schedule.

Based on the external component availability constraints, the control computer, 12 can develop a projected schedule for the network as shown in FIG. 4. The interrelations and dependencies between the events and activities in the network are loaded into memory field I, 31 from terminal, 13 by management or production personnel. The projected event schedule module, 32 gets that information from memory field I, 31 and arranges it as shown in columns 1, 3, and 4 in Table 4. From memory field A, 14 the projected event schedule module gathers the baseline schedule dates for the events and enters them in columns 2 and 5. From memory field B, 15, the projected event schedule module identifies the external components required for each event. From memory field D, 18 the projected event schedule module gathers external slack variables for each external component. For each row in Table 4, as identified by the beginning event (column 1), the projected event schedule module compares the external slack variable of all external components required for that event and finds the least slack value (most critical) and assigns that value as the event external slack variable and enters that value in column 6. This represents the critical external constraint on that beginning event.

For each beginning event (or row) in Table 4, the projected event schedule module, 32 finds all directly prior (contiguous) events and the external slack (column 6) and the internal slack value (column 7) for each directly prior event. The projected event schedule module, 32, enters the least of these values in column 7 for that row. For example, for row 1, the beginning event is E1 (column 1) and the immediately prior event/activity would end with the entry "E1" in column 4, but E1 does not appear in column 4 since E1 is the beginning of a path and has no prior event; therefore, the entry is "NA" for not applicable in column 7. In row 2, the beginning event is E2 which also appears in row 1column 4 showing that row 1 is a contiguous prior event/activity. The least slack in row 1, column 6 or 7 is −1 which is entered in row 2, column 7. Row 4 is analogous to row 1 and row 5 is analogous to row 2. Row 3 begins with E3 which has two prior contiguous event/activities; those being the entries on row 2 and row 5, since both show E3 in column 4. Therefore, the entry in row 3, column 7 is equal to the least value in row 2, column 6 and 4 and row 5, column 6 and 7. These values are +2, −1, +4, +2, respectively. The least is −1 which is entered in row 3, column 7.

Column 7 represents the internal upstream network constraint on the beginning event shown in each row. The Table 4 example is constructed for a project that has not begun yet. After it begins and actual event slack values are available from memory field F, 22, the projected event schedule module will enter these values in column 7 for each beginning event in each row. This provides an updated status on the projects progress. The calculations required to construct the foregoing entries are performed by the projected event schedule module, 32.

Each beginning event will be constrained by the lessor of the external minimum slack in column 6 or the internal minimum slack in column 7. The minimum values are underlined. Reviewing column 6 and 7, the underlined lowest slack value in each row indicates whether the row is externally or internally constrained. The lowest overall slack value is in row 3, column 6 of −2 shows that the project will be 2 days late due to an external component required for event E3. If this were improved, the next constraint is in the E1 to E3 path by an external component required for event E1 which has a slack of −1.

These underlined minimum values are with respect to the baseline schedule dates, so a projected event schedule can be calculated by the project event schedule module, 32 by subtracting the underlined minimum slack value from the baseline schedule dates in columns 2 and 5 in each row and entering the results in column 8 and 9, respectively. For example, in row 1, the underlined lessor value is −1 which when subtracted (with the sign change) from 204 (column 2) and 206 (column 5) yields 205 (column 8) and 207 (column 9). The projected schedule dates shown in columns 8 and 9 are the expected occurrances of these events under the existing constraints. This provides management and production personnel with a detailed and updated schedule of event dates rather than a range of possible dates as reported by other systems. The projected schedule dates can be stored by the projected event schedule module in memory J, 24, in the computer, 12.

If several projects are progressing simultaneously, resources may be shared between the projects. The availability date of a resource may be a major constraint on a project, and it would be identified as a critical external component. This may be mitigated by reviewing the usage of that resource for all projects. For example, a separate time line can be constructed for the resource and the projected event schedule dates for each event/activity and its event slack variable from each project shown on it. The conflicts identified may by minimized by manipulating the projected dates based on project priority and the event slack variable for each event/activity compared to the project's slack goal. These changes will produce new availability dates, new external slack variables, and will be reflected through the normal updating channels to each project. A major advantage of this system is that specific usage dates for the resource are available from the projected event schedules (which are updated) rather than a range of dates provided by other control systems.

Cost can also be monitored using this method. Table 5 shows a sample report that the system might generate at the completion of a project. Column 1 identies each activity. Column 2 shows the budgeted cost for all external components that are required for each activity which is the sum of the individual estimates of the external components. Column 3 shows the actual costs incurred for the external components. Column 4 shows the deviation of the actual cost from the budgeted cost. Column 5 shows the budgeted cost or estimate for the internal effort of performing the activity, the majority of which may be labor costs. Column 6 shows the actual internal cost. Column 7 shows the deviation of actual internal cost from the budgeted cost. Column 8 shows the total budget amount for each activity. Column 9 shows the actual total cost and Column 10 shows the total deviation from budget.

At the bottom of each column is the sum of each entry in the column. For a general overview, reviewing columns 8, 9, and 10, the deviation for each activity indicates the cost impact on the budget and the project totals at the bottom. The project had a total budget of $16,500 and actually spent $16,200, which was $300 under budget.

Figure 5:
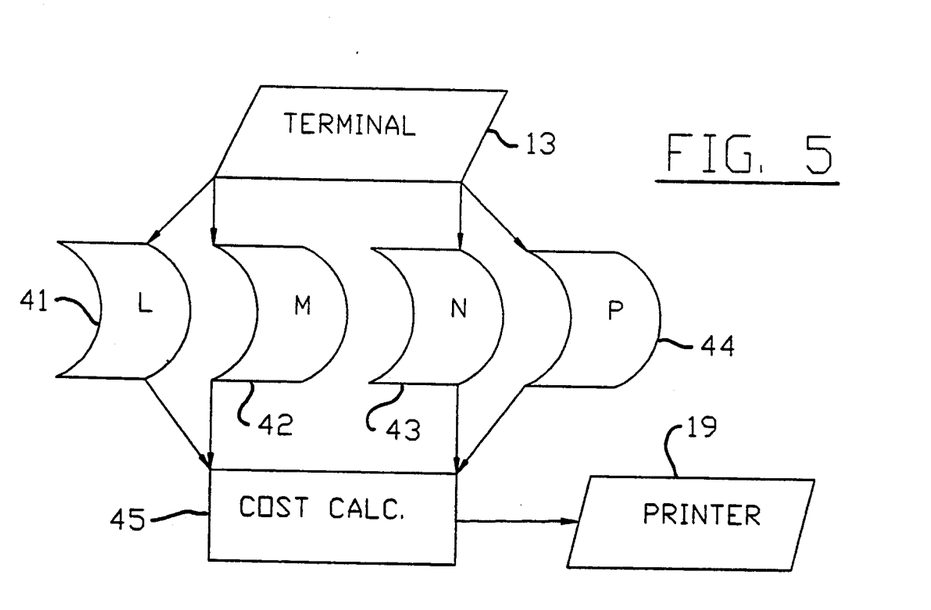
FIG. 5 shows a schematic drawing of the portion of the control system for calculating project costs.

The preparation of this report can be done by the computer as shown in FIG. 5. Project personnel input cost information through a terminal 13 into: memory field L, 41, which stores the budgeted external cost of each activity; memory field M, 42, which stores the budgeted internal cost for each activity; memory field N, 43, which stores the actual external cost for each activity; and memory field P, 44 which stores actual internal costs for each activity. The cost calculator, 45 extracts cost data from each of the memory fields for each of the activities and arranges it in the report form as shown in Table 5 and prints the result on the printer, 19. Of course, there are many ways that the cost information may be entered into the system as well as many ways that the necessary calculations might be performed, the exact details of which are well known in the art.

Since the actual costs and deviations to budget are tied to the completion of activities, there is a one-to-one relationship between each budget value and each actual value. Therefore, during a project, the actual cost for activities completed can be directly compared to the budget for the completed activities. This is superior to existing systems that reference the budget cost and actual cost to time, since a skew or offset in the results will occur if the project runs ahead or behind schedule. Similarly, any delay or lag in reporting actual costs will skew the interim results which will mask the true cost situation. Also, to maintain an up-to-date projection of costs during a project, updated estimates of the actual costs can be entered in the actual cost memory fields N, 43 and P, 44 with a tag or footnote that they are estimates. Any interim report will then give projected actual costs and projected deviations to budget to provide a warning to which management personnel can react.

While the invention has been particularly shown and described in reference to a preferred embodiment thereof, it will be understood by those skilled in the art that the foregoing and other changes in form and detail may be made therein without departing from the spirit and scope of the invention.

TABLE 1

| 1 External Compnent No. | 2 Event No. | 3 Baseline Schedule Date | 4 Estimated Availab'y Date | 5 External Slack | 6 Slack | | | | | | | |
|---|---|---|---|---|---|---|---|---|---|---|---|---|
| | | | | | +5 | +4 | +3 | +2 | +1 | 0 | −1 | −2 |
| 91001 | E1 | 204 | 205 | −1 | | | | | | | • | |
| 91002 | E1 | 204 | 203 | +1 | | | | | • | | | |
| 91003 | E2 | 206 | 204 | +2 | | | | • | | | | |

TABLE 1-continued

| 1<br>External<br>Compnent<br>No. | 2<br>Event<br>No. | 3<br>Baseline<br>Schedule<br>Date | 4<br>Estimated<br>Availab'y<br>Date | 5<br>External<br>Slack | 6 Slack |     |     |     |     |   |    |    |
|---|---|---|---|---|---|---|---|---|---|---|---|---|
|   |   |   |   |   | +5 | +4 | +3 | +2 | +1 | 0 | −1 | −2 |
| 91004 | E2 | 206 | 203 | +3 |   |   | * |   |   |   |   |   |
| 91005 | E3 | 209 | 211 | −2 |   |   |   |   |   |   |   | * |
| 91006 | E3 | 209 | 208 | +1 |   |   |   |   | * |   |   |   |
| 91007 | E4 | 203 | 203 | 0 |   |   |   |   |   | * |   |   |
| 91008 | E4 | 203 | 201 | +2 |   |   |   | * |   |   |   |   |
| 91009 | E5 | 206 | 201 | +5 | * |   |   |   |   |   |   |   |
| 91010 | E5 | 206 | 202 | +4 |   | * |   |   |   |   |   |   |

TABLE 2

| 1<br>External<br>Compnent<br>No. | 2<br>Event<br>No. | 3<br>Baseline<br>Schedule<br>Date | 4<br>Project<br>Slack<br>Goal | 5<br>Critical<br>Dates |
|---|---|---|---|---|
| 91001 | E1 | 204 | −1 | 205 |
| 91002 | E1 | 204 | −1 | 205 |
| 91003 | E2 | 206 | −1 | 207 |
| 91004 | E2 | 206 | −1 | 207 |
| 91005 | E3 | 209 | −1 | 210 |
| 91006 | E3 | 209 | −1 | 210 |
| 91007 | E4 | 203 | −1 | 204 |
| 91008 | E4 | 203 | −1 | 204 |
| 91009 | E5 | 206 | −1 | 207 |
| 91010 | E5 | 206 | −1 | 207 |

TABLE 3

| 1<br>External<br>Compnent<br>No. | 2<br>Event<br>No. | 3<br>External<br>Slack | 4 Slack |     |     |     |     | 5<br>Cost to<br>Improve<br>Avail'y |
|---|---|---|---|---|---|---|---|---|
|   |   |   | +2 | +1 | 0 | −1 | −2 |   |
| 91001 | E1 | −1 | 200 | 200 | 200 | * |   | $200/day |
| 91002 | E2 | +1 | 100 | 0 |   |   |   | $100/day |
| 91005 | E3 | −2 | 200 | 200 | 200 | 200 | * | $200/day |
| 91006 | E3 | +1 | 100 | * |   |   |   | $100/day |
| 91007 | E4 | 0 | 4000 | 4000 | * |   |   | $4000/day |
| Cost to improve final compl. date: |   |   | 9600 | 5000 | 600 | 200 | 0 |   |

TABLE 4

| 1<br>Begin<br>Event<br>No. | 2<br>Baseline<br>Schedule<br>Date | 3<br>Activity<br>No. | 4<br>Ending<br>Event<br>No. | 5<br>Baseline<br>Schedule<br>Date | 6<br>Extern<br>Minim.<br>Slack | 7<br>Intern<br>Minim.<br>Slack | 8<br>Proj<br>Begin<br>Date | 9<br>Proj<br>End<br>DAte |
|---|---|---|---|---|---|---|---|---|
| E1 | 204 | A1 | E2 | 206 | −1 | NA | 205 | 207 |
| E2 | 206 | A2 | E3 | 209 | +2 | −1 | 207 | 210 |
| E3 | 209 | A5 | E6 | 215 | −2 | −1 | 211 | 217 |
| E4 | 203 | A3 | E5 | 206 | +2 | NA | 201 | 204 |
| E5 | 206 | A4 | E3 | 209 | +4 | +2 | 204 | 207 |

TABLE 5

| 1<br>Activity<br>No. | 2<br>Budget<br>Extern<br>Cost | 3<br>Actual<br>Extern<br>Cost | 4<br>Deviat | 5<br>Budget<br>Intern<br>Cost | 6<br>Actual<br>Intern<br>Cost | 7<br>Deviat | 8<br>Total<br>Budgt<br>Cost | 9<br>Total<br>Budgt<br>Cost | 10<br>Deviat |
|---|---|---|---|---|---|---|---|---|---|
| A1 | 2000 | 1500 | −500 | 200 | 150 | −50 | 2200 | 1650 | −550 |
| A2 | 4000 | 4500 | +500 | 400 | 450 | +50 | 4400 | 4950 | +550 |
| A3 | 5000 | 4800 | −200 | 500 | 450 | −50 | 5500 | 5250 | −250 |
| A4 | 3000 | 3200 | +200 | 300 | 200 | −100 | 3300 | 3400 | +100 |
| A5 | 1000 | 800 | −200 | 100 | 150 | +50 | 1100 | 950 | −150 |
|   | 15000 | 14800 | −200 | 1500 | 1400 | −100 | 16500 | 16200 | −300 |

I claim:

1. A method for the manufacture of a product, comprising:

generating a network of activities required to manufacture a product, estimating a time duration for each activity, choosing a desired final completion date for completion of manufacturing, calculating a baseline schedule date for the start of each activity, said baseline schedule date for the start of each prior activity being equal to the baseline schedule date for the start of the following activity in said network minus said estimated time duration of said prior activity, said desired final completion date being the last baseline schedule date in said network, entering said baseline schedule date corresponding to each said activity into a memory bank of a digital computer, identifying external components required to support each activity and entering external component identification and corresponding activity into said memory bank of said computer, determining an availability date for each said component and entering said availability date into said memory bank of said computer, calculating a external component slack value for each said component internally in said computer following programmed instructions, said component slack value being equal to the baseline schedule date for the start of the activity requiring said component minus the availability date of said component, said computer retrieving from said memory bank previously entered said baseline schedule date and said availability date for each said component, said computer storing said component slack values in said memory bank, determining said external component slack value that is most late, determining dates of actual start of said activities and entering said date of actual start into said memory bank of said computer, calculating an internal slack value for each activity having an actual start date internally in said computer following programmed instructions, said internal slack value being equal to said baseline schedule date for the start of said activity minus the actual start date of said activity, said computer retrieving from said memory bank previously entered said baseline schedule date and actual start date for each said activity, said computer storing said internal slack values in said memory bank, determining said internal slack value that is most late, determining the project most late slack value by comparing said most late component slack value and said most late internal slack value, determining a projected final completion date by subtracting the project most late slack value from said desired final completion date on said network, displaying said projected final completion date on an output device of said computer, manufacturing said product, said manufacturing applying resources to transform an article from an initial state into a different final state, allocating said resources in said manufacturing based on said external component slack values and said internal slack values, increasing resources allocated to external components and activities having most late slack values.

2. A method for the manufacture of a product, comprising:

generating a network of activities required to manufacture a product, estimating a time duration for each activity, choosing a desired final completion date for completion of manufacturing, calculating a baseline schedule date for the start of each said activity, said baseline schedule date for the start of each prior activity being equal to the baseline schedule date for the start of the following activity in said network minus said estimated time duration of said prior activity, said desired final completion date being the last baseline schedule date in said network, entering said baseline schedule date corresponding to each said activity into a memory bank of a digital computer, identifying external components required to support each activity and entering external component identification and corresponding activity into said memory bank of said computer, determining an availability date for each said component and entering said availability date into said memory bank of said computer, calculating a external component slack value for each said component internally in said computer following programmed instructions, said component slack value being equal to the baseline schedule date for the start of the activity requiring said component minus the availability date of said component, said computer retrieving from said memory bank previously entered said baseline schedule date and said availability date for each said component, said computer storing said component slack values in said memory bank, determining, for each activity, a most late external component slack value from among said component slack values for components required for said activity, determining, for each activity, an internal slack value for a most late internal constraint on beginning said activity, determining, for each activity, an activity most late slack value from among said most late external component slack value and said internal slack value, calculating a projected activity beginning date by subtracting said activity most late slack value from said baseline schedule date for the beginning of said activity, displaying said projected activity beginning date on an output device of said computer, manufacturing said product, said manufacturing applying resources to transform an article from an initial state into a different final state, allocating said resources in said manufacturing based on said external component slack values and said internal slack values, increasing resources allocated to external components and activities having most late slack values.

3. A method for the manufacture of a product, comprising:

generating a network of activities required to manufacture a product, estimating a time duration for each activity, choosing a desired final completion date for completion of manufacturing, calculating a baseline schedule date for the start of each said activity, said baseline schedule date for the start of each prior activity being equal to the baseline schedule date for the start of the following activity in said network minus said estimated time duration of said prior activity, said desired final completion date being the last baseline schedule date in said network, entering said baseline schedule date corresponding to each said activity into a memory bank of a digital computer, identifying external components required to support each activity and entering external component identification and corresponding activity into said memory bank of said computer, determining an availability date for each said component and entering said availability date into said memory bank of said computer, calculating an external component slack value for each said component internally in said computer following programmed instructions, said component slack value being equal to the baseline schedule date for the start of the activity requiring said component minus the availability date of said component, said computer retrieving from said memory bank previously entered said baseline schedule date and said availability date for each said component, said computer storing said component slack values in said memory bank, determining a most late external component slack value, calculating a projected final completion date by subtracting said most late component slack value from said desired final completion date, displaying said projected final completion date on an output device of said computer, manufacturing said product, said manufacturing applying resources to transform an article from an initial state into a different final state, allocating said resources in said manufacturing based on said external component slack values, increasing resources allocated to external components having most late slack values.

4. A method for the manufacture of a product as recited in claim 3, further comprising:

choosing a project external slack goal.

5. A method for the manufacture of a product as recited in claim 4, further comprising:

calculating critical dates for the start of each activity, said critical date for the start of an activity being equal to said baseline schedule date for the start of said activity minus said project external slack goal.

6. A method for the manufacture of a product, comprising:

generating a network of activities required to manufacture a product, estimating a time duration for each activity, choosing a desired final completion date for completion of manufacturing, calculating a baseline schedule date for the start of each said activity, said baseline schedule date for the start of each prior activity being equal to the baseline schedule date for the start of the following activity in said network minus said estimated time duration of said prior activity, said desired final completion date being the last baseline schedule date in said network, entering said baseline schedule date corresponding to each said activity into a memory bank of a digital computer, determining dates of actual start of said activities and entering said date of actual start into said memory bank of said computer, calculating an internal slack value for each activity having an actual start date internally in said computer following programmed instructions, said internal slack value being equal to said baseline schedule date for the start of said activity minus the actual start date of said activity, said computer retrieving from said memory bank previously entered said baseline schedule date and actual start date for each said activity, said computer storing said internal slack values in said memory bank, determining a most late internal slack value, calculating a projected final completion date by subtracting said most late internal slack value from said desired final completion date, displaying said projected final completion date on an output device of said computer, manufacturing said product, said manufacturing applying resources to transform an article from an initial state into a different final state, allocating said resources in said manufacturing based on said internal slack values, increasing resources allocated to activities having most late slack values.

* * * * *